UNLOAD ← → PLATING

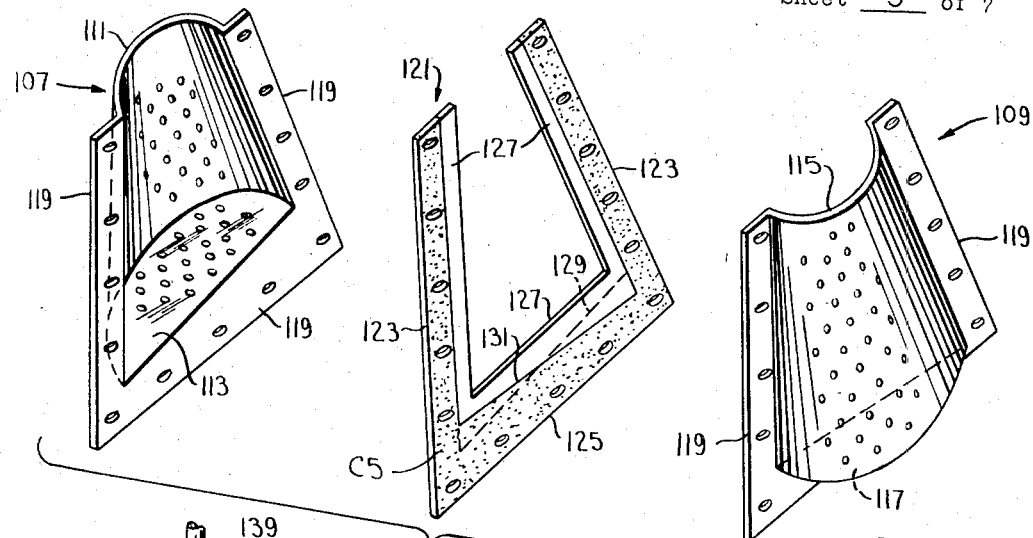
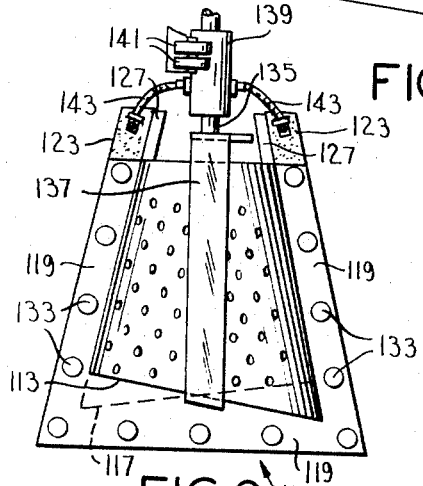
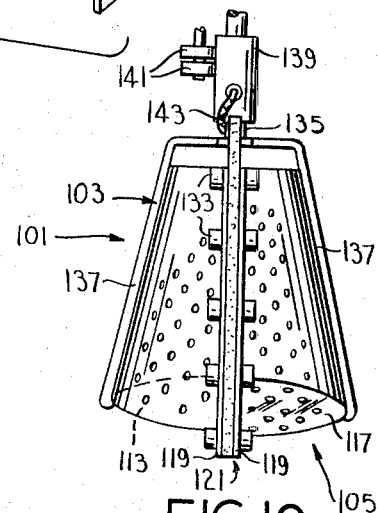
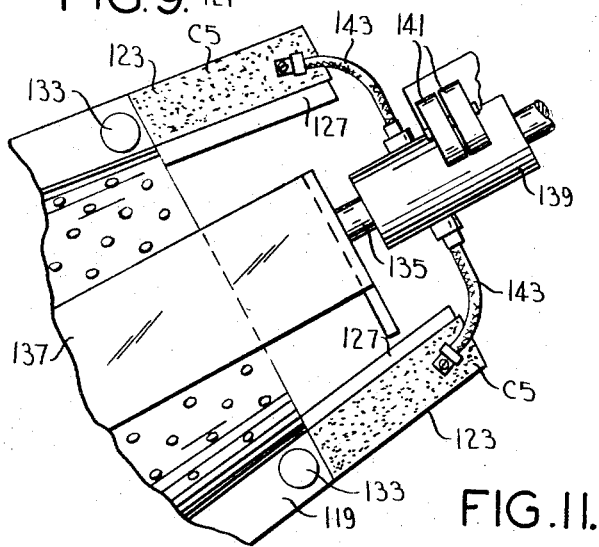

March 4, 1969  L. P. KUMPF  3,431,192
PLATING APPARATUS

Filed June 9, 1965  Sheet 7 of 7

United States Patent Office 3,431,192
Patented Mar. 4, 1969

3,431,192
PLATING APPARATUS
Leonard P. Kumpf, Affton, Mo., assignor to Lasalco Incorporated, St. Louis, Mo., a corporation of Missouri
Filed June 9, 1965, Ser. No. 462,617
U.S. Cl. 204—213
Int. Cl. C23b 5/78
13 Claims

ABSTRACT OF THE DISCLOSURE

Plating apparatus comprising an electrically nonconductive barrel for holding work to be electrolytically treated. In a first embodiment, the barrel comprises two sections disposed end-to-end and has a flat electrode ring removably clamped between flanges at the inner ends of the two sections. The ring has a bare inner rim projecting into the interior of the drum for establishing electrical contact with the work to be treated, and has an insulation coating on the part thereof clamped between the two barrel sections. Current collector means connected to the ring includes a conductive center hub having a pair of current-carrying part-cylindric inserts biased apart by a spring. A second type of hub has inboard and outboard axial seals and means responsive to rotation of the barrel for maintaining the outboard seal under compression. In a second embodiment, a nonconductive barrel is split longitudinally into two sections and a generally U-shaped electrode is clamped between flanges of the two sections, the electrode having a nonconductive coating on the portion clamped between the flanges and a bare inner rim projecting into the interior of the drum.

---

This invention relates to electrolytic treatment apparatus, and more particularly to such apparatus comprising a barrel for holding work to be electrolytically treated in an electrolyte.

In electroplating and electropolishing operations, for example, it is conventional to place work to be treated in a barrel, the barrel with the work therein being lowered into a tank containing an electrolyte and rotated for tumbling the work. In the case of electroplating, the work is constituted as a cathode for electrolytic deposition thereon of metal from the electrolyte, and in the case of electropolishing the work is constituted as an anode for electrolytic removal of metal therefrom, typically by use of flexible cable type electrodes extending into the barrel from the ends thereof for contacting the work. These flexible cable type electrodes are prone to break off within the barrel and have other disadvantages. Among the several objects of this invention may be noted the provision of an improved barrel construction having an electrode incorporated therein which is not prone to break off; the provision of such a construction in which the electrode is a rigid element, as distinguished from a flexible element, and which rotates with the barrel, as distinguished from being loosely inserted in the barrel as in the case of the prior flexible cable type electrodes, to eliminate problems attendant upon use of the latter type of electrodes; the provision of a construction such as described which efficiently provides for contact of the electrode with the work; the provision of a construction such as described which efficiently collects current from the electrode; the provision of a construction such as described which enables efficient removal and replacement of electrodes when required; and the provision of a construction such as described with means for effectively sealing the current collector thereof. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in elevation of one end of a plating apparatus including a barrel of this invention;

FIG. 8 is an exploded view of another type of barrel of this invention;

FIG. 9 is a view in elevation of the assembled FIG. 8 barrel;

FIG. 10 is a right side view in elevation of the FIG. 9 barrel;

FIG. 11 is an enlarged fragmentary view showing attachment of the FIG. 8 barrel to a shaft;

Corresponding reference characters indicate corresponding parts throughout the several views of the drawings.

Figure 1:
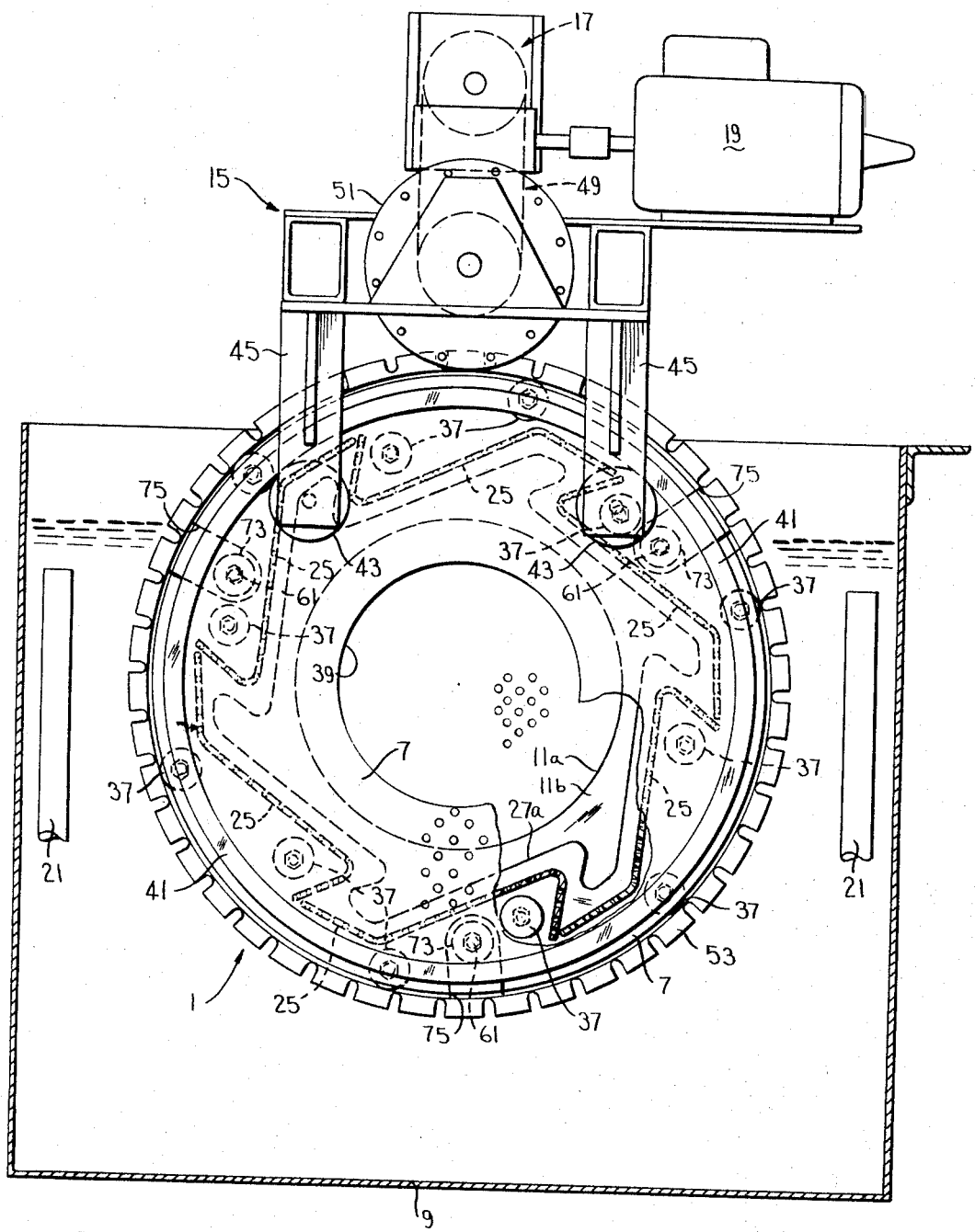
Figure 2:
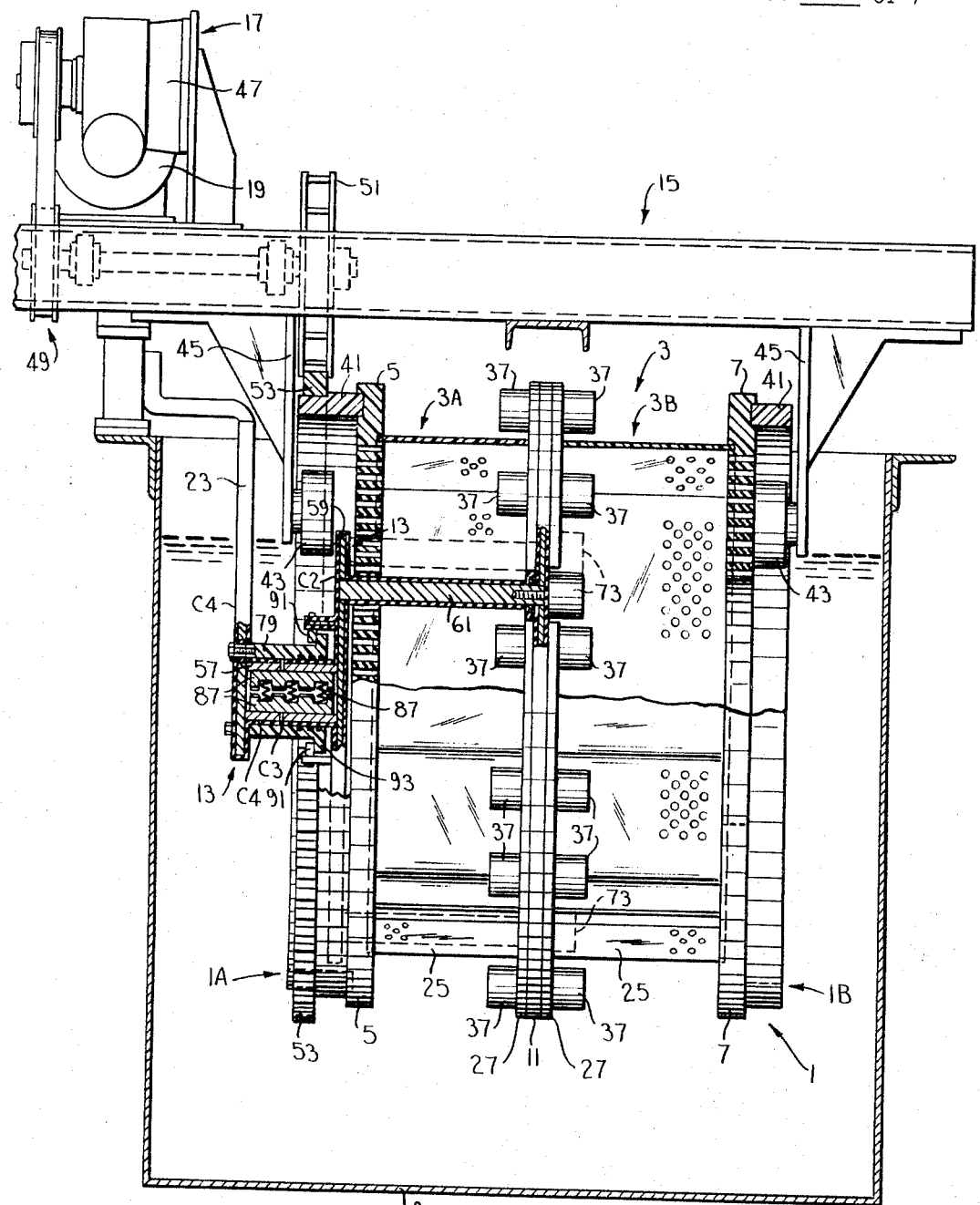
FIG. 2 is a side elevation, with parts broken away and shown in section, of the FIG. 1 apparatus.
Figure 3:
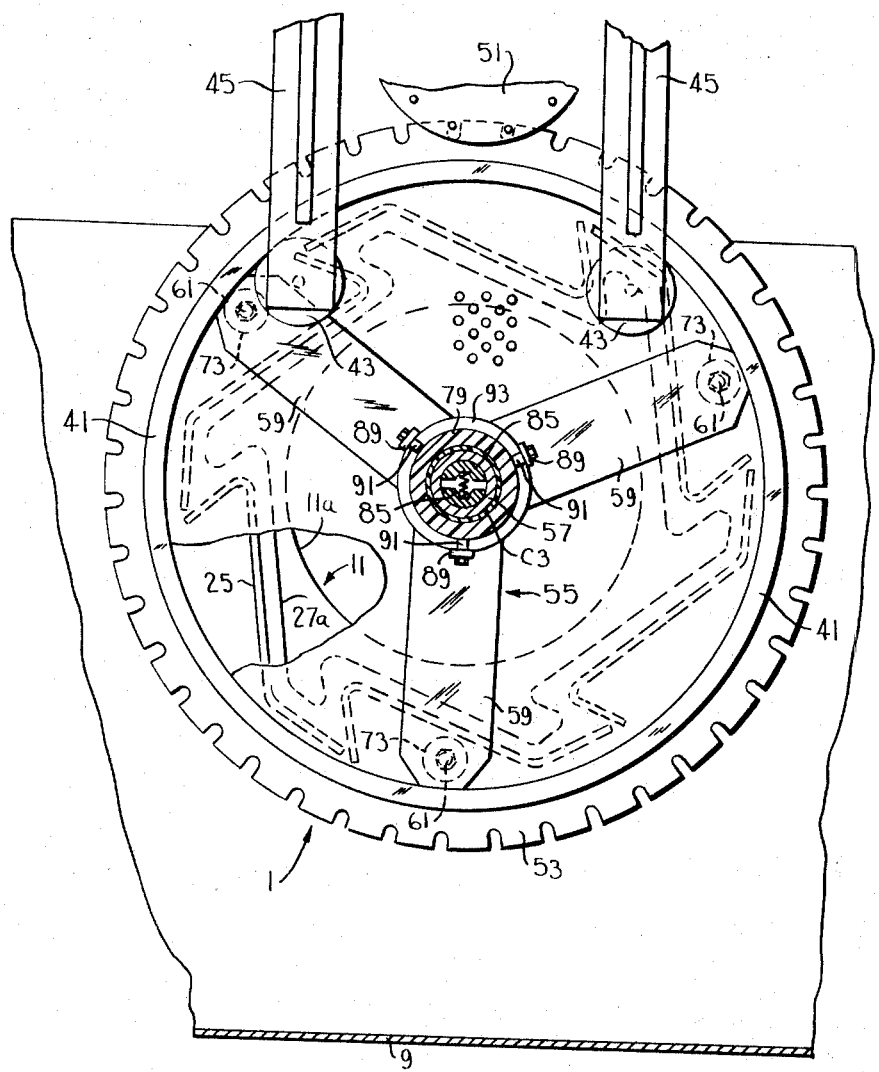
FIG. 3 is a view in elevation of the other end of the FIG. 1 apparatus.

Referring first to FIGS. 1–3, a first form of apparatus constructed in accordance with this invention is shown to comprise an electrically nonconductive barrel 1 for holding work to be electroplated. The barrel comprises a drum 3 having end heads 5 and 7, and is adapted for rotation on its axis in generally horizontal position in a tank 9 containing an electroplating solution. An electrode 11 is secured to the barrel for rotation therewith extending around the drum 3 and exposed to the work interiorly of the barrel. Means for collecting current from the electrode as the barrel rotates is generally designated 13. The barrel is suspended from a carrier 15 and driven via a drive 17 from a motor 19 on the carrier or in other suitable manner. Anodes are provided in the tank as indicated at 21. It will be understood that the barrel, with work to be electroplated therein, is lowered into the tank, and rotated therein while current is passed through the solution via the anodes and electrode 11, the current-collecting means 13 including a fixed bus bar or cathode feeder 23. The electrode 11 establishes electrical contact with the work being tumbled in the barrel as it rotates.

In accordance with this invention, the barrel 1 is in effect split in half on its central transverse plane into two half-barrel sections 1A and 1B disposed end-to-end. Section 1A includes the end head 5 and one-half 3A of the drum 3; section 1B includes the end head 7 and the other half 3B of the drum. The drum portion of each barrel section 1A and 1B is preferably made up of a plurality of panels 25 which are of such cross section that the drum of the barrel has a corrugated configuration such as appears in FIGS. 1 and 3. The panels 25, at their head ends, are secured to the end heads 5 and 7 (fitting in grooves in the end heads), and the panels and end heads are perforated for entry of the electroplating solution to the interior of the barrel. The ends heads and panels may, as shown, be made of solid plastic (e.g., polypropylene), or they may be made of metal plate coated with an electrical insulation and corrosion-resistant coating, such as a suitable plastisol.

Secured to the inner ends of drum sections 3A and 3B opposite the end heads 5 and 7 are annular flat flanges 27. These may be made of solid plastic or coated metal plate, like the end heads. They are circular on their outer periphery, and of corrugated form on their inner periphery 27a with the outline of the latter corresponding to but somewhat smaller than the outline of the corrugated configuration of the drum sections. Panels 25, at their flange ends, may fit in grooves in flanges 27 as appears in FIG. 5. Flanges 27 extend radially outward from the drum sections.

Electrode 11 consists of a flat ring of a metal having good electrical conductive properties, preferably copper. It has a circular outer periphery generally on the same radius as the outer periphery of flanges 27, and a circular inner periphery 11a (around the central opening of the ring) of smaller diameter than the minimum diametrical dimension of the opening defined by the inner periphery 27a of flanges 27. The electrode ring 11 has a partial coating indicated at C1 of an electrical insulation and corrosion-resistant material, such as a suitable plastisol, but is bare around its inner margin. In this respect, coating C1 is applied so that the inner periphery 11a and portions 11b of the side faces of the ring are bare, with the edge of coating C1 corresponding generally to the corrugated outline of the inner periphery 27a of flanges 27.

Figure 5:
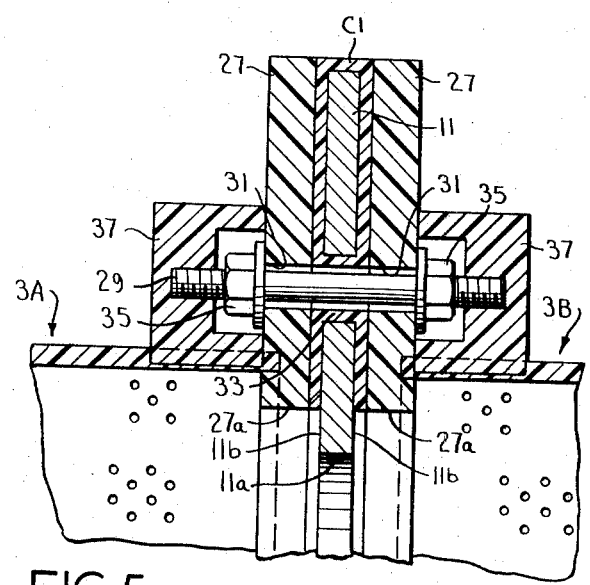

Ring 11 is removably clamped between flanges 27 and barrel sections 1A and 1B are secured together by a plurality of short tie bolts 29 extending through holes 31 in flanges 27 and coated holes 33 in ring 11, with nuts 35 threaded on bolts 29 and plastic cap nuts 37 applied over the nuts 35 (see FIG. 5). The locations of these appear at 37 in FIG. 1.

The end head 7 of barrel section 1B has a central opening 39 for loading and unloading of work. Each end head 5 and 7 has an annular rim 41 which projects outward for rotatably suspending the barrel 1 on rollers 43 mounted at the lower ends of hangers 45 depending from the carrier 15, there being two such rollers at each end of the barrel. Drive 17 for the barrel comprises a speed reducer 47 driven by motor 19 and driving via a belt and pulley drive 49 a lantern wheel 51 which meshes with a gear 53 mounted on rim 41 of the end head 5 of barrel section 1A.

Figure 4:
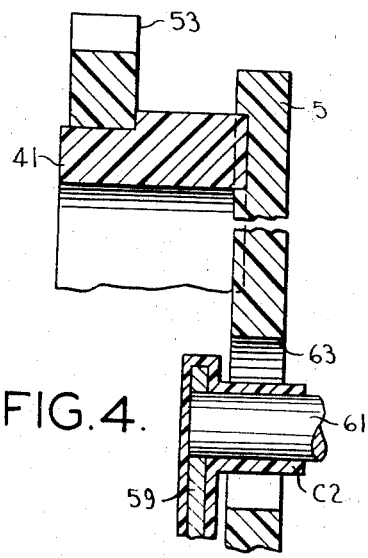
FIGS. 4–7 are enlarged detail sections of details of the barrel.
Figure 6:
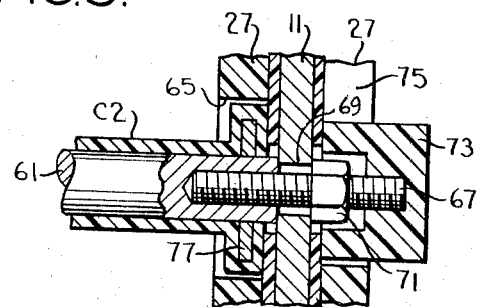

The current collecting system 13 comprises a current-carrying spider assembly generally designated 55, including an electrically conductive hub 57 (see FIG. 7), three electrically conductive arms 59 extending radially outward from the hub (see FIGS. 3, 4 and 7) and spaced at 120° intervals around the hub, and three electrically conductive rods 61 extending between the outer ends of the arms and the electrode ring 11 through holes 63 in the end head 5 of barrel section 1A. Hub 57, arms 59 and rods 61 may be made of copper, for example. Arms 59 and rods 61 are completely coated with an electrical insulation and corrosion-resistant material, such as a suitable plastisol, as indicated at C2. Hub 57 is similarly coated on the outside as indicated at C3, but is bare on the inside and at its outer end. The rods 61 have their outer ends secured in any suitable manner to arm 59 for electrical conduction therebetween, as by being brazed in holes in the arms. They extend through holes 65 in the flange 27 of barrel section 1A with their inner ends in metal-to-metal contact with the electrode ring for electrical conduction therebetween, and are detachably secured at their inner ends to ring 11 by means of screw-threaded rods 67 extending through holes 69 in the ring 11 having nuts 71 threaded thereon and plastic cap nuts 73 threaded on the rods over the nuts 71 (see FIG. 6). The flange 27 of barrel section 1B has notches 75 accommodating the nuts 71 and 73. Each rod 61 may have a collar 77 adjacent its end which engages the ring 11.

Hub 57 (which is hollow) is rotary in a cylindric housing 79 made of electrical insulation material, such as a suitable plastic, secured to the cathode feeder 23. O-ring seals such as indicated at 81 may be provided between the hub and the housing. Also fixed to the cathode feeder 23 in metal-to-metal contact therewith and extending therefrom into the housing 79 in line with hub 57 is an electrically conductive hollow cylindric stud 83, which may be made of copper for example. Stud 83 has the same inside and outside diameter as hub 57, and has an electrical insulation and corrosion-resistant coating on the outside as indicated at C4. The feeder 23 is similarly coated. Contained within stud 83 and hub 57 are two part-cylindric electrically conductive current-carrying inserts 85, made of copper for example, biased apart by coil compression springs 87 into engagement with stud 83 and hub 57. This arrangement permits play of hub 57 relative to stud 83, while insuring conduction of current as between hub 57 and stud 83 via the inserts 85. Lugs 89 on spider arms 59 carry keepers 91 located on the outside of a flange 93 at the inner end of housing 79 to limit axial play of the barrel.

As the barrel 1 rotates in the tank 9, the work is tumbled in the barrel, and electrical contact with the work is established via the bared inner rim of the electrode ring 11 which protrudes into the interior of the drum of the barrel in the central transverse plane of the drum. This bared inner rim of ring 11 extends completely girthwise of the drum, so that, even though the drum may not be completely immersed in the electroplating solution in the tank, there is always a substantial portion of the rim below the level of the solution for contact purposes. The ring, being rigid, has no tendency to break off. When the ring needs to be serviced or replaced, it is a relatively simple matter to detach the two barrel sections, detach the ring from rods 61, and replace it after servicing or insert another ring.

FIGS. 8–11 illustrate a second form of apparatus of this invention, comprising an electrically nonconductive barrel or basket 101, shown as comprising a frusto-conical drum 103 with an end head or bottom 105 at its larger end, being open at its smaller end. The barrel is split on its central longitudinal plane into two sections 107 and 109. Section 107 constitutes half the drum 103 and half the bottom 105, and section 109 constitutes the other half of the drum and the other half of the bottom. The half-drum and half-bottom portions of section 107 are respectively designated 111 and 113. The half-drum and half-bottom portions of section 109 are respectively designated 115 and 117. Each of sections 107 and 109 is formed with a flange 119 extending outwardly all around its periphery. The bottom portion 13 of section 107 and the bottom portion 117 of section 109 are flat and oppositely inclined relative to the axis of the barrel (see FIG. 9).

A generally U-shaped electrode 121 is clamped between the flanges 119 of the barrel sections. The electrode is formed of flat metal stock, utilizing a metal having good electrical conductive properties, preferably copper. It has leg portions 123 angled in correspondence with the slope of the conical peripheral wall of the barrel (and the slope of the side portions of flanges 119) and a relatively wide base portion 125. The electrode has a partial coating C5 of an electrical insulation and corrosion-resistant material, such as a suitable plastisol, but is bare around its inner margin or rim 127 which projects into the interior of the barrel from between the flanges 19. Coating C5 is applied completely to cover the portion of the electrode with is sandwiched between the flanges 119, leaving rim 127 bare. As to the base portion 125 of the electrode, the coating C5 is applied so that its inner edge 129 on that face of the electrode toward flange 119 of section 105 and its inner edge 131 on that face of the electrode toward flange 119 of section 107 are oppositely inclined in correspondence with the opposite sloping of the bottom portions 113 and 117 of the barrel.

The electrode 121 is removably clamped between flanges 19 and barrel sections 107 and 109 are secured together by bolt and nut fasteners which may be of a type corresponding to that used in fastening together the barrel sections 1A and 1B of the first form of barrel above described, the locations of these being indicated at 133 in FIGS. 9 and 10. The length (height) of the legs 123 of the electrode is greater than the height of the barrel, and they project endwise from between flanges 119 at the open end of the barrel.

The barrel 101 is used in conjunction with a known type of apparatus which includes a barrel-carrying shaft 135 mounted for swinging movement about a horizontal axis transverse to the shaft for swinging the barrel down into a tank to an inclined position such as shown in FIG. 11 for the electroplating operation and up out of the tank to a generally horizontal position for barrel transfer purposes. Shaft 135 carries a cradle 137 for the barrel. Shaft 135 is driven to rotate the barrel when the barrel is lowered into a tank, and has an electrical collector ring 139 rotatable therewith contacted by brushes 141 and electrically connected by leads 143 to the ends of legs 123 of electrode 121.

As the barrel or basket 101 rotates in oblique position in a tank containing an electroplating solution, the work in the barrel is tumbled, and electrical contact with the work is established via bared inner rim 127 of the electrode 121 which protrudes into the interior of the drum of the barrel in the central longitudinal plane of the drum. The oppositely inclined disposition of the two halves 113 and 117 of the barrel effects appropriate tumbling for contact of the work with the electrode. The electrode, being rigid, has no tendency to break off. When it needs to be serviced or replaced, it is a relatively simple matter to detach the two barrel sections 107 and 109 and remove it.

Figure 7:
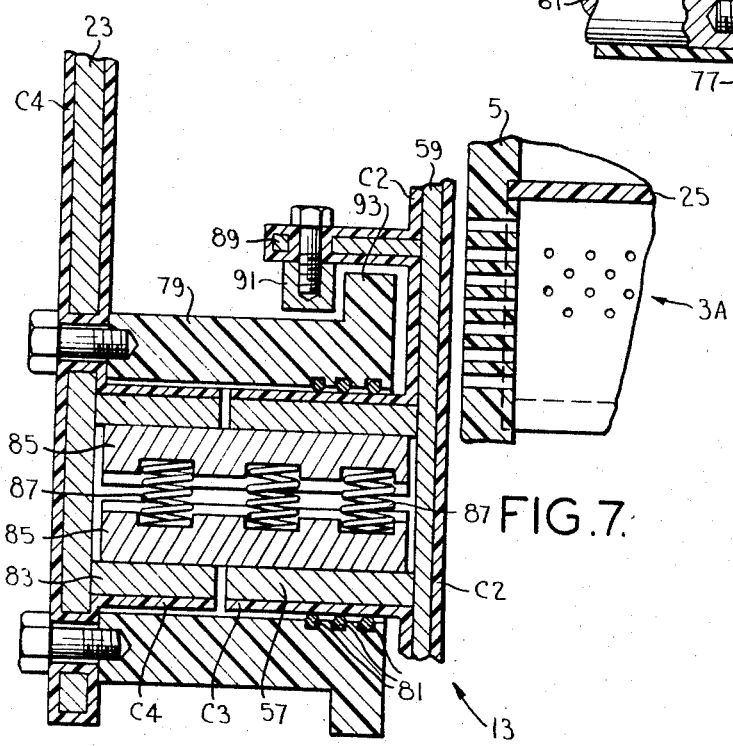

In FIGS. 12–16, there is illustrated a modification of the FIG. 7 current-collector assembly adapted automatically to take up wear in the seals and to compensate for thermal expansion and contraction of parts so as to insure sealing off from the electrolyte in the tank 9 of those parts of the collector assembly which need to be sealed. In the latter regard, it will be understood that, in certain operations involving immersing the barrel in a series of tanks containing treating baths and removing the barrel from the tanks, the collector assembly is subject to considerable variation in temperature which causes expansion and contraction of parts thereof.

Figure 12:
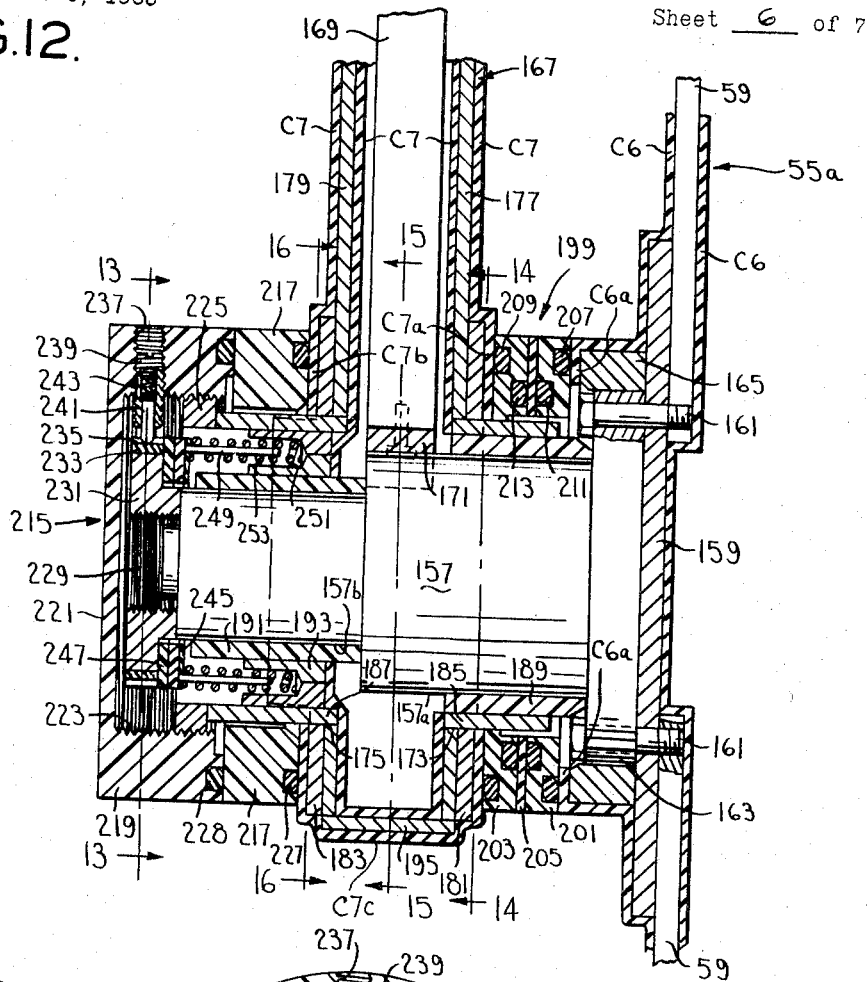
FIG. 12 is an enlarged section showing an alternative current-collecting construction for the apparatus of FIGS. 1–7.

As shown in FIG. 12, the current-carrying spider assembly, which is generally designated 55a to distinguish it from the spider assembly 55 shown in FIG. 3, includes a solid electrically conductive hub 157 (instead of the hollow hub 57). This hub may be made of brass, for example. On the inner end of the hub (its right end as shown in FIG. 12) is an electrically conductive disk 159 (a copper disk, for example). Spider arms 59, the same as shown in FIGS. 3 and 7, are secured flat against the face of the disk by screws 161, which hold the arms and the disk secured to the hub. The hub has a flange 163 at its inner end (its spider end) and the screws pass through this flange. A ring 165 is suitably secured (as by brazing) to the disk 159 and surrounds flange 163, projecting outward (to the left) beyond the flange to provide space for the heads of the screws. The arms 59, disk 159 and ring 165 are coated with an electrical insulation and corrosion-resistant material, such as a suitable plastisol, as indicated at C6, including an annular lip C6a of the coating on the outboard end face of the ring 159.

The hub 157 is rotary in a bearing structure associated with a housing 167 which is fixed in position extending down from the carrier 15 of FIGS. 1 and 2. At 169 is indicated the cathode feeder, by means of which current is passed to the hub 157 and thence through the disk and the spider arms 59. The cathode feeder consists of an electrically conductive bar, for example, a copper bar of rectangular cross section, having a carbon brush 171 on its lower end which contacts the hub 157. The housing 167 consists of a metal tube of rectangular cross section considerably larger than the feeder 169. When the barrel is immersed in a bath, the tube extends up out of the bath and protects the cathode feeder therefrom. The tube is open at the top, and the cathode feeder extends out of the upper end of the tube for connection to the feeder of a current-carrying conductor. The feeder simply hangs loosely in the tube. It is relatively heavy (for example, it may be a one inch by three inch copper bar having a length of about fourteen inches) and its gravity bias provides good electrical contact between the brush 171 and the hub 157. The tube (which does not carry current and is primarily a protector for the cathode feeder) is a metal tube (made of steel, for example) coated inside and outside with an electrical insulation and corrosion-resistant material, such as a suitable plastisol, as indicated at C7.

To provide the bearing structure for the hub 157, the housing or tube 167 is provided with coaxial circular holes 173 and 175 of the same diameter in the inboard and outboard side walls 177 and 179 thereof. Surrounding these and suitably secured to the walls 177 and 179 are flat reinforcing rings 181 and 183 (made of steel, for example). Secured in holes 173 and 175 and in rings 181 and 183 are metal sleeves 185 and 187 (made of steel, for example). Sleeve 185 extends inward (toward the spider end of the hub) from the tube side wall 177. Sleeve 187 extends outward from the tube side wall 179. The sleeves are coaxial and have the same inside diameter. The hub 157 is of stepped formation, having an inboard end section 157a journalled in a bearing 189 received in the inboard sleeve 185, and a reduced-diameter outboard section 157b journalled in a bearing 191 received in a spring retainer ring 193 fixed in the outboard sleeve 187. Bearings 189 and 191 are preferably nylon bearings. The lower end of the cathode tube 167 below the hub 157 is sealed as by a closure plate 195. The coating C7 includes annular lips C7a and C7b covering the exposed faces of the rings 181 and 183, as well as a portion C7c covering the closure plate 195.

Interposed between the annular lips C6a and C7a is an inboard rotary axial seal assembly 199 comprising inner and outer rings 201 and 203 and an intermediate flat ring 205. These rings surround the sleeve 185, with clearance between them and this sleeve. Rings 201 and 203 are preferably made of a corrosion-resistant plastic, such as polypropylene, and ring 205 is an anti-friction corrosion-resistant ring, preferably made of Teflon. Rings 201 and 203 are grooved for the reception of O-ring annular seals 207 and 209 contacting sealing lips C6a and C7a and O-ring annular seals 211 and 213 contacting ring 205.

Interposed between annular lip C7b and an end cap 215 on the outer end of the hub 157 is an outboard rotary axial sealing ring 217. This ring 217, which is preferably made of a corrosion-resistant plastic such as polypropylene, surrounds sleeve 187, with clearance between it and this sleeve. Cap 215, which may be made of a suitable corrosion-resistant plastic such as polypropylene, has a relatively thick annular peripheral wall 219 extending inward from a relatively thin end wall 221. Wall 219 of the cap is internally threaded as indicated at 223, and the cap is thereby threaded on an externally threaded ring 225 which is secured (as by welding) to the outer end of sleeve 187. The ring 217 has an annular groove in its inboard face receiving an O-ring annular seal 227 contacting the sealing lip C7a. Wall 219 of the cap has an annular groove in its inner end face receiving an O-ring annular seal 228 engaging the outer face of ring 217. The threading at 219 and on the ring 225 is left-hand so that counterclockwise rotation of the cap relative to the hub as viewed from the outer end of the hub (as viewed from the left in FIG. 12) tends to screw the cap on.

Figure 13:
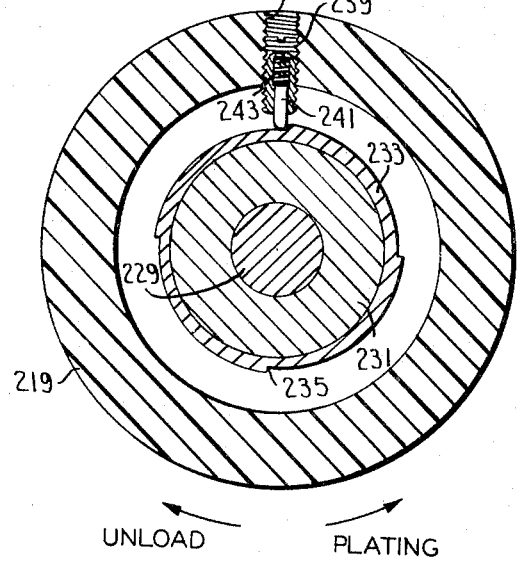
FIGS. 13–16 are transverse sections taken on lines 13—13, 14—14, 15—15 and 16—16, respectively, of FIG. 12.
Figure 14:
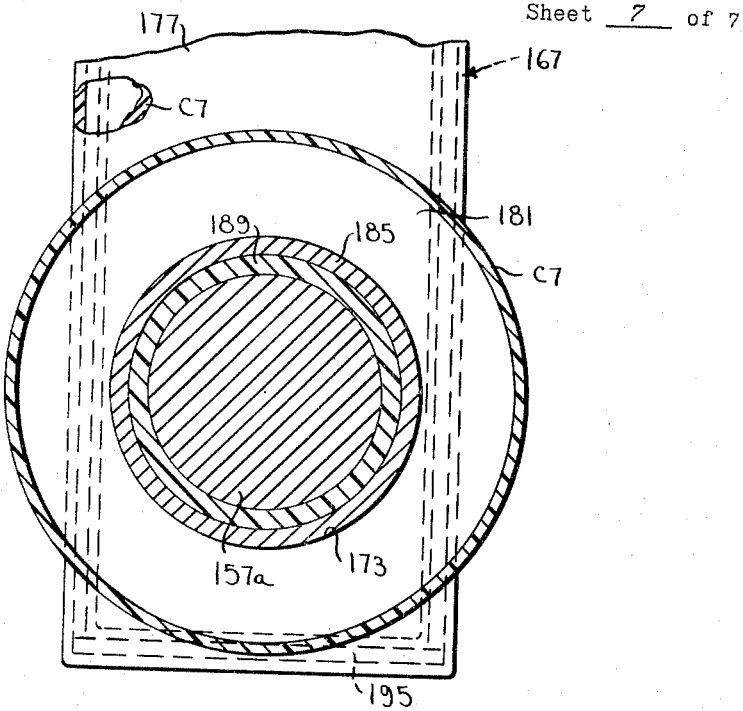
Figure 15:
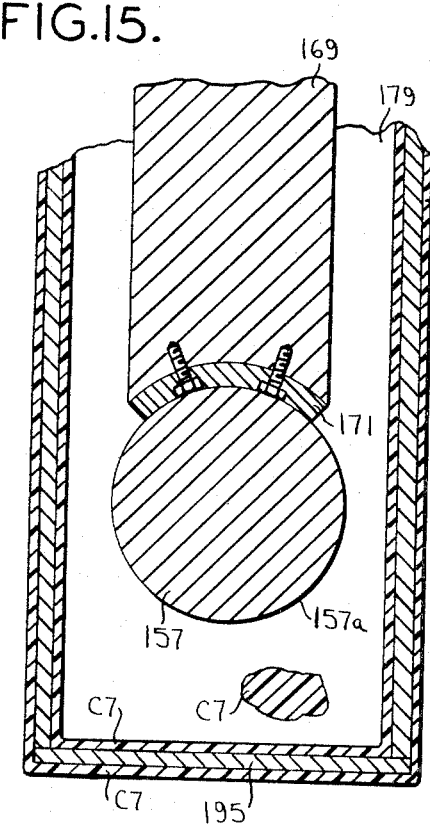
Figure 16:
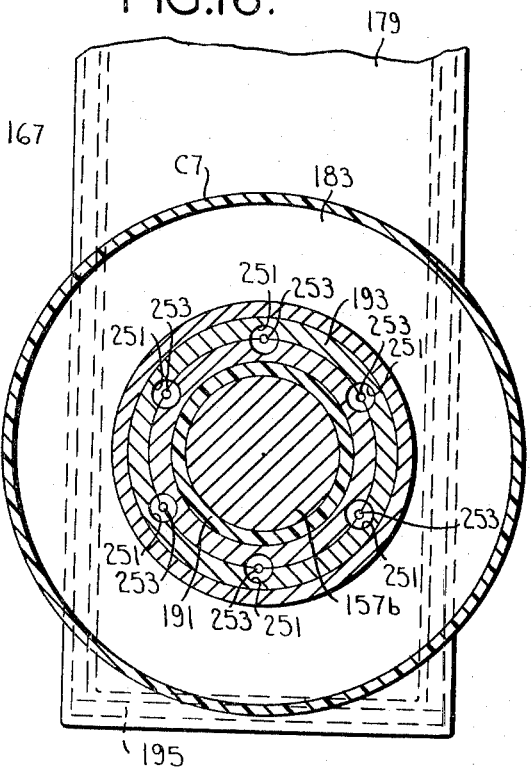

The hub 157 has a further reduced-diameter outer end extension 229 on which is threaded a metal ring 231. The external diameter of ring 231 is greater than the diameter of hub section 157b so that the ring projects radially outward beyond the periphery of this hub section. A ratchet ring 233, having a plurality of ratchet teeth 235 (four such teeth being provided spaced at 90° intervals as shown in FIG. 13), is secured on the periphery of ring 231. Cap 215 has a radial hole 237 in its annular wall 219 in which is threaded a retainer 239 for an overload release pawl 241. The latter is biased radially inward into engagement with the ratchet ring 231 by a spring 243. A flat metal ring 245 surrounds the outer end of section 157b of the hub 157, with anti-friction means constituted by two flat Teflon rings each designated 247 between this metal ring and the ring 231. Ring 245 has a plurality of pins 249 extending inward therefrom into recesses 251 in the spring retainer ring 195. Coil compression springs 253 surround the pins 249, being compressed between the inner ends of recesse 251 and the pin ring 245. These springs react from spring retainer ring 193 (which is fixed in position with the cathode tube 167) to exert an axial outward bias on the hub tending to effect compression and tight sealing of the inboard seal assembly 199. The force for compression of the outboard sealing ring 217 comes from screwing up the cap 215.

It will be understood that the spider assembly 55a of FIGS. 12–16 is associated with a barrel the same as that shown in FIG. 2; that, when the barrel loaded with work to be plated is immersed in the liquid in the tank, the barrel is rotated in one direction; and that, when the barrel is lifted out of the tank for unloading of the work, it is rotated in the opposite direction. The hub 157 rotates with the barrel. As shown in FIG. 13, rotation of the hub is counterclockwise as viewed from its outer end for plating, clockwise for unloading. When the hub is rotated counterclockwise during immersion or immediately prior thereto, and if the cap 215 should be loose, a tooth 235 on the ratchet ring 233 will engage the pawl 241 and rotate the cap counterclockwise along with the hub until the cap is threaded up tight on the screw ring 225. Since the thread at 219 is a left-hand thread, counterclockwise rotation of the cap threads it up on the screw ring. When the cap has been tightened, the ratchet teeth slip past the pawl. The effect is to tighten up not only the outboard seal provided by ring 217 and the cap 215 (and the O-rings 227 and 228 associated therewith), but also to tighten up the inboard seal assembly 199. Thus, immediately upon the start of rotation of the barrel in plating direction, if there should have been any previous loosening of the seals due to wear or thermal expansion or contraction, they are immediately tightened up. On rotation of the barrel in unloading direction (clockwise as viewed in FIG. 13), the pawl 241 simply clicks over the ratchet teeth.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus comprising an electrically nonconductive barrel for holding work to be electrolytically treated, said barrel comprising a drum and end heads on the drum, said barrel being split transversely into two sections disposed end-to-end, and an electrode in the form of a ring clamped between the adjacent ends of said two sections, said sections having radially outwardly extending flanges at their said ends between which said electrode ring is clamped, said electrode ring having an electrical insulation coating on the portion thereof clamped between the flanges and a bare inner rim portion projecting partially into the interior of the barrel, said barrel being adapted for rotation in a tank containing an electrolyte, the projecting inner portion of the electrode ring being exposed to the work interiorly of the barrel for establishing electrical contact with the work as the barrel rotates, and means for collecting current from the electrode ring as the barrel rotates comprising an electrically conductive spider member at one end of the barrel rotatable with the barrel, said spider having a hub and arms extending radially outward from the hub beyond the periphery of the drum, conductors on the outside of the drum interconnecting the arms and the portion of the electrode ring clamped between said flanges, and a fixed current-collecting member at said one end of the barrel for collecting current from the hub of the spider, said spider, said conductors and said fixed current-collecting member having an electrical insulation coating thereon.

2. Apparatus as set forth in claim 1 wherein said fixed current-collecting member comprises a fixed tubular stud in line with said hub, and current-carrying means within said hub and said stud and in contact therewith.

3. Apparatus as set forth in claim 2 wherein said current-carrying means comprises a pair of part-cylindric inserts, and spring means biasing said inserts apart into engagement with the hub and the stud.

4. Apparatus as set forth in claim 1 wherein the electrode ring is a flat ring removably clamped between said flanges, and said conductors are rods extending between the outer ends of the arms of the spider and the portion of the electrode ring clamped between said flanges, said rods extending through the end head at said one end of the barrel.

5. Electrolytic treatment apparatus comprising an electrically nonconductive barrel for holding work to be treated, said barrel being adapted for rotation in a tank containing an electrolyte, an electrode secured to the barrel and rotatable therewith, said electrode being exposed to the work interiorly of the barrel for establishing electrical contact with the work as the barrel rotates, and means for collecting current from the electrode as the barrel rotates, said means comprising an electrically conductive hub at one end of the barrel rotatable with the barrel and an electrically conductive feeder in contact with the periphery of the hub, said hub being journalled in a stationary tubular housing extending upward from the hub, said feeder being located in said housing, means enclosing the hub inboard of the housing comprising a rotary axial seal, means enclosing the hub outboard of the housing comprising a rotary axial seal, spring means for maintaining the inboard seal under compression, and means responsive to rotation of the hub in one direction for maintaining the outboard seal under compression.

6. Apparatus as set forth in claim 5 wherein said inboard seal comprises two corrosion-resistant sealing rings having an anti-friction corrosion-resistant sealing ring interposed therebetween.

7. Apparatus as set forth in claim 5 wherein said outboard seal comprises a collar extending outboard from said housing surrounding said hub, a cap threaded on the end of said collar over the outboard end of the hub, a sealing ring interposed between the cap and surrounding the collar, and means interposed between the hub and the cap for screwing up of the cap on rotation of the hub in one direction to force the sealing ring in the direction toward the housing.

8. Apparatus as set forth in claim 7 wherein said means for effecting screwing up of the cap is a pawl and ratchet means adapted for release when the cap is screwed up tight.

9. Apparatus comprising an electrically nonconductive barrel, said barrel comprising a drum and a head at one end of the drum, said barrel being split longitudinally into two sections each including half the drum and half the head, and a generally U-shaped electrode having its leg portions secured between the margins of the drum portions of said sections and its base portion secured between the margins of the head portions of said sections, said electrode having an inner rim portion projecting into the interior of the barrel.

10. Apparatus as set forth in claim 9 wherein the barrel sections have outwardly projecting flanges all around their margins between which the electrode is detachably clamped.

11. Apparatus as set forth in claim 10 wherein the electrode has an electrical insulation coating on the portion thereof clamped between the flanges, the inner rim of the electrode being bare.

12. Apparatus as set forth in claim 9 wherein the head portions of the barrel sections are oppositely inclined relative to the barrel axis.

13. Apparatus as set forth in claim 12 wherein the barrel sections have outwardly projecting flanges all around their margins between which the electrode is detachably clamped, the electrode having an electrical insulation coating on the portion thereof clamped between the flanges, said coating, on the portion of the electrode at the head end of the barrel, having oppositely inclined inner edges on opposite faces thereof in correspondence with the opposite inclination of the head portions of the barrel.

References Cited

UNITED STATES PATENTS

| | | | |
|---|---|---|---|
| 1,165,346 | 12/1915 | Schulte | 204—213 |
| 1,744,792 | 1/1930 | Newey et al. | 204—213 |
| 1,790,289 | 1/1931 | Thompson | 204—213 |
| 3,328,281 | 6/1967 | Marshall | 204—279 |
| 3,244,613 | 4/1966 | Karlquist | 204—297 |
| 3,256,170 | 6/1966 | Neilson | 204—213 |

FOREIGN PATENTS

| | | |
|---|---|---|
| 834,575 | 11/1938 | France. |
| 1,220,432 | 1/1960 | France. |
| 1,040,869 | 10/1958 | Germany. |
| 17,384 | 9/1907 | Great Britain. |

JOHN H. MACK, *Primary Examiner.*

W. VAN SISE, *Assistant Examiner.*

U.S. Cl. X.R.

204—279